UNITED STATES PATENT OFFICE.

WM. GINNAUGH, OF NILES, MICHIGAN.

COMPOSITION FOR CLEANING MARBLE, &c.

Specification forming part of Letters Patent No. 47,295, dated April 18, 1865.

*To all whom it may concern:*

Be it known that I, WILLIAM GINNAUGH, of Niles, in the county of Berrien and State of Michigan, have invented a new and Improved Marble Restorative; and I do hereby declare that the following is a full, clear, and exact description thereof, which will enable others skilled in the art to fully understand and make use of the same.

This invention is intended for cleaning, restoring, and purifying marble—namely, tombstones, monuments, and other parts exposed to the weather. Such parts are liable to turn black from the influence of the atmosphere, and by the application of this preparation with a stiff brush all dirt and spots will be removed, and, furthermore, the pores of the marble are filled up, so as to admit no more dirt or moisture after its surface has once been cleaned. By the use of this preparation a beautiful finish can be given to the marble, and it is readily restored to its natural color.

My preparation is composed of ground marble, oxalic acid, pumice-stone, muriatic acid, alcohol, niter, borax, and sal-soda. These ingredients are mixed together in about the following proportion: ground marble, three parts; oxalic acid, two parts; pumice-stone, two parts; muriatic acid, one part; alcohol, one part; saltpeter, two parts; borax, one part; sal-soda, one part. The ground marble and pumice-stone are dissolved in the muriatic acid, with the addition of oxalic acid, the saltpeter, borax, and sal-soda are dissolved in the alcohol, and both solutions are mixed together in a suitable vessel, and the composition can be used immediately; or it may be filtered, if it is desired to obtain a clearer liquid.

For the purpose of cleaning the surface of marble which has been exposed to the changes of the atmosphere, I apply some of my composition with a stiff brush, and thereby the original color of the marble is restored, and, furthermore, the pores of the same fill up, and are not liable to take up any more moisture from the atmosphere, so that marble having been treated with my composition will preserve its color, and not be liable to become black by the changes of the atmosphere.

Having thus described my invention, I claim as new and desire to secure by Letters Patent—

The within-described marble-restorative, composed of the ingredients specified, and mixed together in about the proportion and substantially in the manner set forth.

WILLIAM GINNAUGH.

Witnesses:
ROBERT FOWLER,
EBENEZER MCILVAINE.